(No Model.)  5 Sheets—Sheet 1.

C. T. A. H. WIEDLING.
GAS MOTOR.

No. 398,108.  Patented Feb. 19, 1889.

Witnesses,
W. B. Corwin
H. L. Gill

Inventor
Carl T. A. H. Wiedling
per W. Bakewell & Sons
Attorneys.

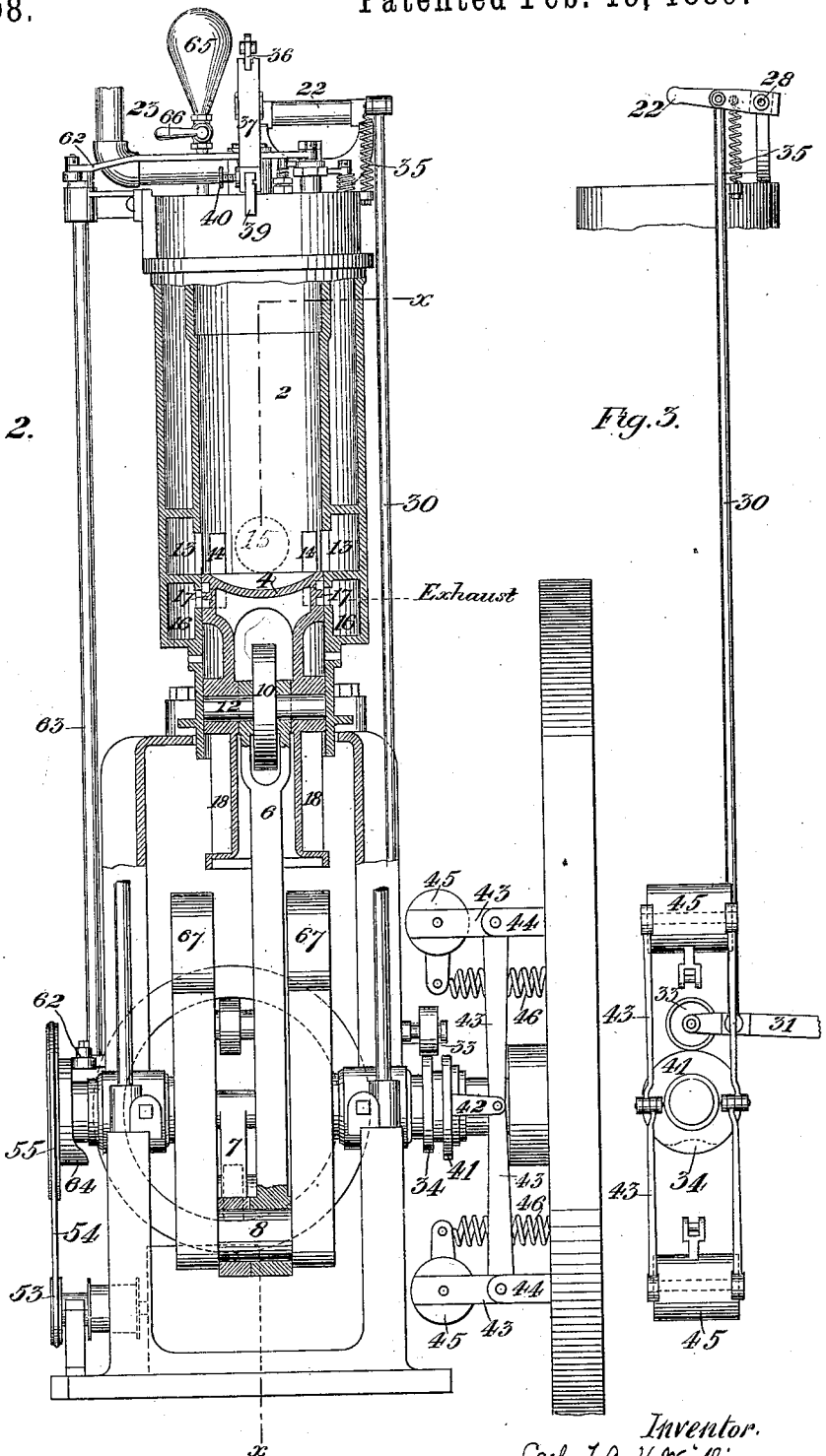

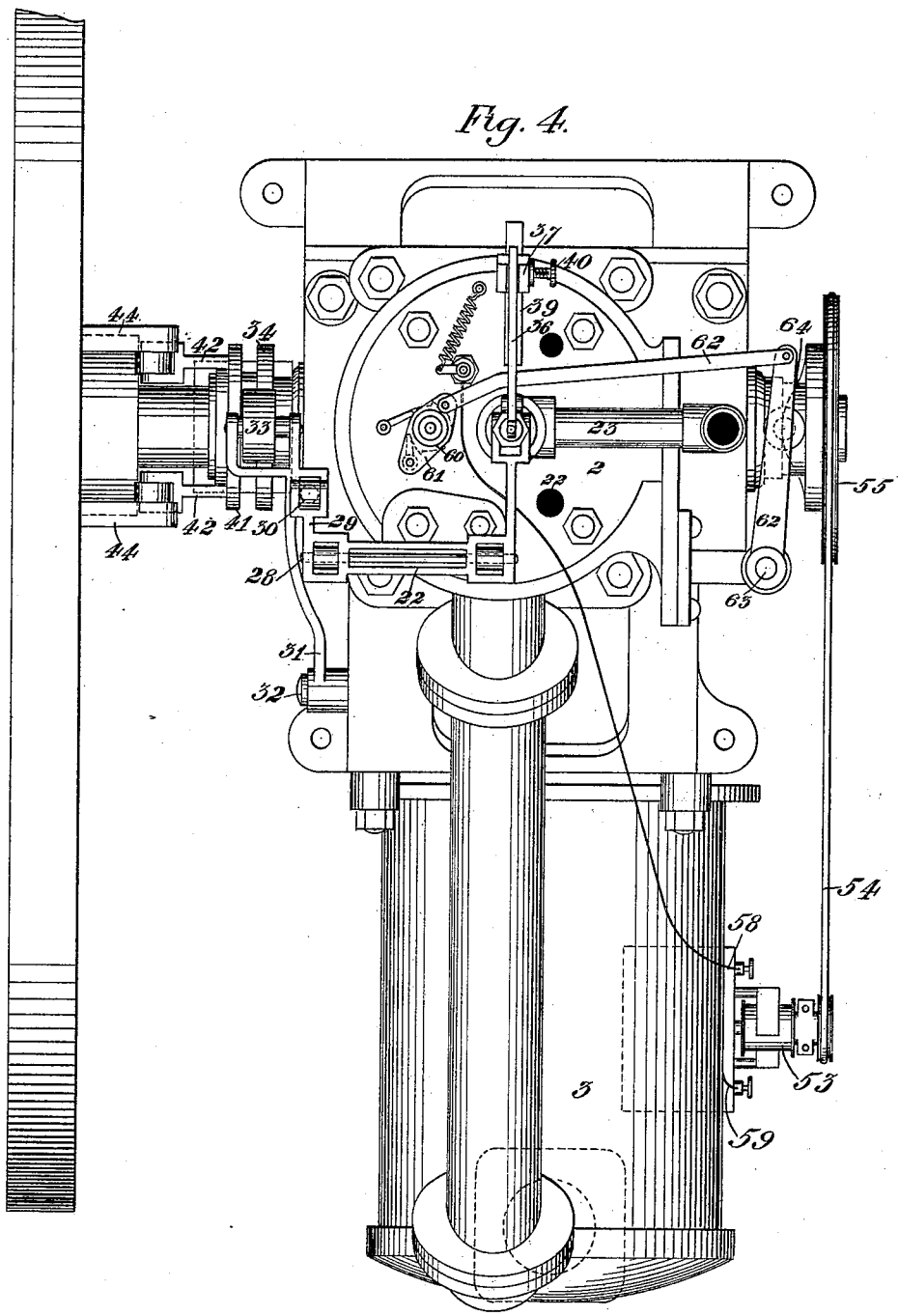

(No Model.) 5 Sheets—Sheet 4.
C. T. A. H. WIEDLING.
GAS MOTOR.
No. 398,108. Patented Feb. 19, 1889.
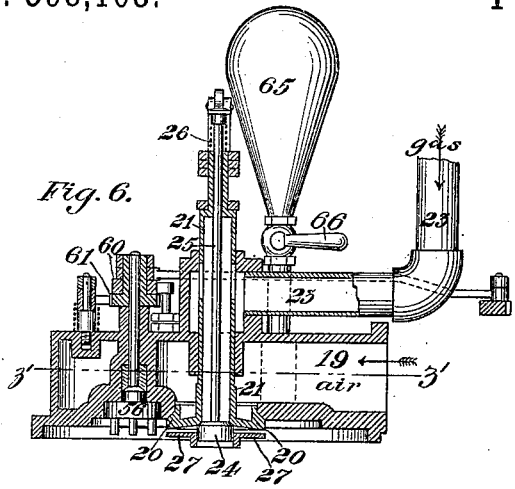
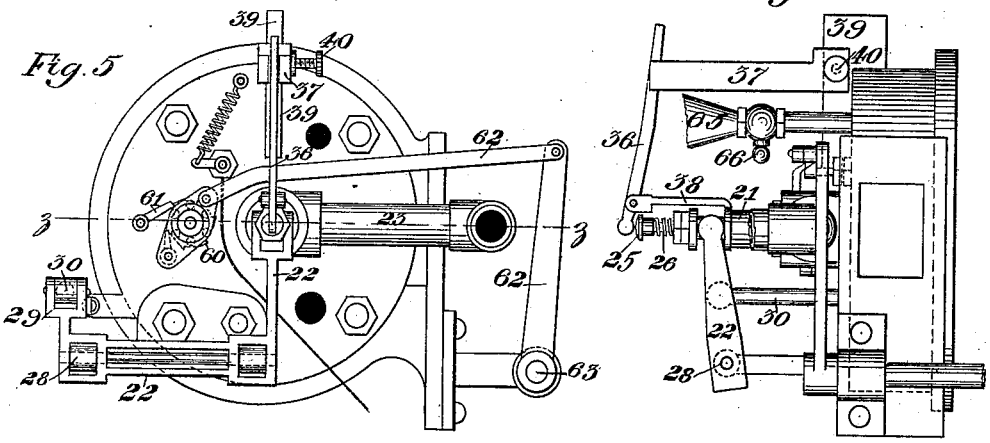
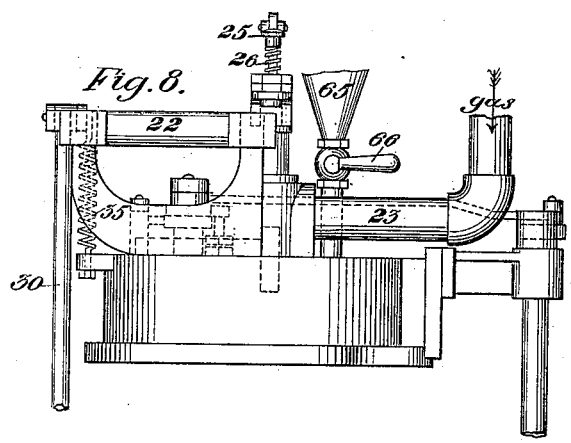
Witnesses,
Inventor
Carl T. A. H. Wiedling
per W. Bakewell & Sons
Attorneys.

(No Model.) 5 Sheets—Sheet 5.

C. T. A. H. WIEDLING.
GAS MOTOR.

No. 398,108. Patented Feb. 19, 1889.

Witnesses
W. B. Corwin
H. L. Gill

Inventor
Carl T. A. H. Wiedling
per W. Bakewell & Sons
Attorneys

United States Patent Office.

CARL THEODOR AUGUST HERMANN WIEDLING, OF NEW YORK, N. Y., ASSIGNOR TO JOHN S. CONNELLY, OF PLAINFIELD, NEW JERSEY, AND THOMAS E. CONNELLY, OF BROOKLYN, NEW YORK.

GAS-MOTOR.

SPECIFICATION forming part of Letters Patent No. 398,108, dated February 19, 1889.

Application filed December 22, 1887. Serial No. 258,755. (No model.)

*To all whom it may concern:*

Be it known that I, CARL THEODOR AUGUST HERMANN WIEDLING, of the city of New York, in the county of New York and State of New York, have invented a new and useful Improvement in Gas-Motors; and I do hereby declare the following to be a full, clear, and exact description thereof, reference being had to the accompanying drawings, forming part of this specification, in which—

Figure 1:
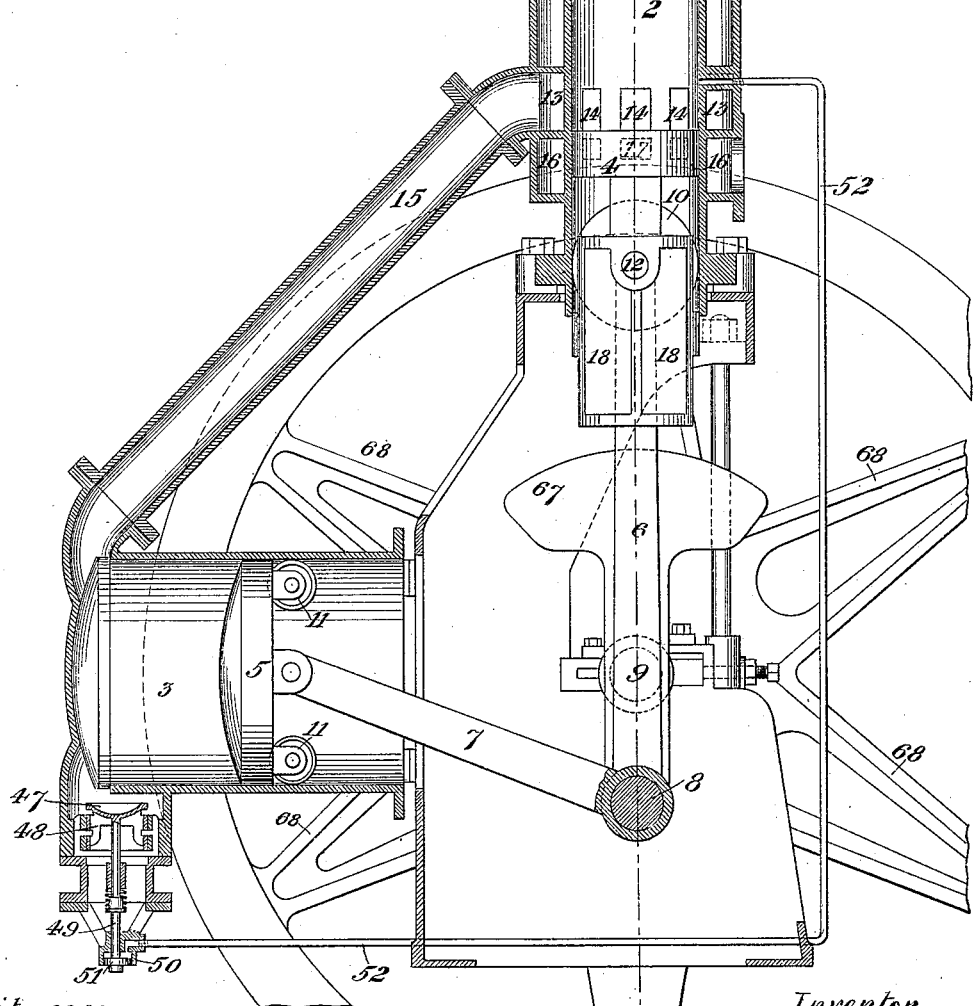
Figure 9:
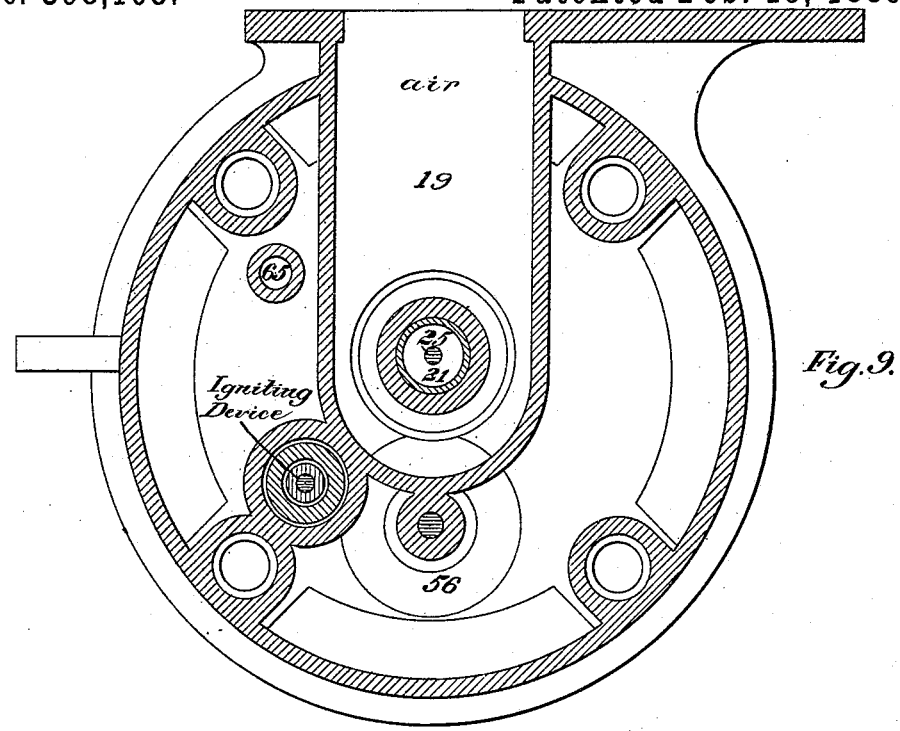
Figure 10:
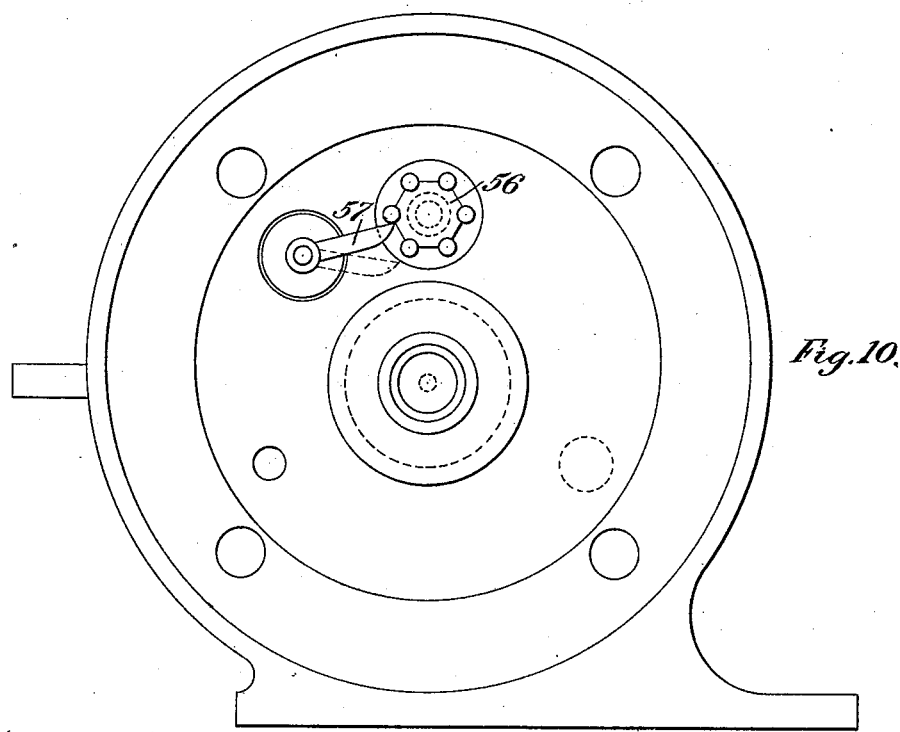

Figure 1 is a vertical central section through the engine on the line $x\ x$ of Fig. 2. Fig. 2, Sheet 2, is a vertical central section on the line $y\ y$ of Fig. 1, the section plane being transverse to the section plane of Fig. 1. Fig. 3 is a detail view showing the mechanism for actuating the gas-inlet valve and the governor by which the admission of gas to the explosion-chamber is regulated in conformity with the speed of the engine. Fig. 4, Sheet 3, is a plan view of the engine. The figures on Sheet 4 illustrate in detail the construction of the gas and air inlet valves, the igniting device, and that part of my engine which I call the "starting-chamber," Fig. 5 being a plan view of the top of the high-pressure-cylinder head, the starting-chamber, however, being omitted for clearness of illustration. Fig. 6 is a vertical central cross-section on the line $z\ z$ of Fig. 5. Fig. 7 is a side view of the parts shown in Figs. 5 and 6, and Fig. 8 is a front view thereof. Fig. 9, Sheet 5, is an enlarged horizontal cross-section on the line $z'\ z'$ of Fig. 6. Fig. 10 is a bottom plan view of the parts shown in Fig. 6.

Like symbols of reference indicate like parts in each.

The object of my invention is to simplify the construction of gas-engines and to render them more efficient by utilizing as far as possible all the energy of the exploding gases directly in the generation of effective power.

Referring now to Figs. 1, 2, and 4 of the drawings, the engine comprises two cylinders, 2 and 3, one of which, 2, is preferably of less diameter than the other, and is called by me the "high-pressure" or "primary" cylinder, while the other cylinder, 3, which is of larger diameter and is suitably connected with the cylinder 2, I call the "low-pressure" or "secondary" cylinder. These cylinders are suitably supported by the frame of the machine, preferably with their axial lines at right angles to each other, and are provided with pistons 4 and 5, whose connecting-rods 6 and 7 are connected to the same crank, 8, on the fly-wheel shaft 9 of the engine.

In order to give ease of motion to the pistons and to take up the side pressure of the connecting-rods, I provide the pistons with friction-rollers, which work against the inside of the cylinder. The roller 10 of the piston 4 is of nearly the same diameter as the inside of the cylinder, and is journaled on the pin 12, to which the connecting-rod is attached. I show the other piston, 5, provided with two small friction-rollers, 11, arranged on its periphery, suitably journaled on axes transverse to the line of motion of the piston, and all bearing against the cylinder. The arrangement of these rollers is not a necessary feature of my invention, since I desire to cover, broadly, the use of one or more arranged in any suitable way. Hence the rollers of the piston 4 may be arranged like those of the piston 5, and vice versa. In the arrangement which I have shown, however, the rollers are so set that they shall be in the same plane with the line of side-thrust produced by the connecting-rod, the object being that they may directly take up this thrust. At the inner or closed end of the cylinder 2 is the air and gas inlet, controlled by suitable valves, hereinafter described. The outer end of the cylinder is closed and at an intermediate point is a surrounding annular chamber, 13, connected with the inside of the cylinder by suitable ports, 14, which extend directly through the cylinder-wall, and also connected by means of a pipe or channel, 15, with the inner or closed end of the secondary cylinder, 3. Immediately below the chamber 13 is a similar chamber, 16, connected with the inside of the cylinder by ports 17. These are the exhaust-ports, and the chamber 16, communicating with the open air, forms the channel through which the exhaust or burned gas finds its exit from the cylinder. The ports 14 and 17 are controlled directly by the piston 4 and by a valve which is below the piston, and which is constituted by downwardly-projecting extensions of the piston-walls, forming a double slide-valve, 18, which serves to connect the ports 14 and 17, in the manner to be hereinafter explained.

I shall now give a general description of the operation of the parts which I have described.

As shown in Figs. 1 and 2, the piston 4 is at the end of its outstroke and the secondary piston 5 is about at the middle of its outstroke, and in the continued motion of the parts the piston 5 will therefore be about one-half of a stroke (equivalent to one quarter-revolution of the fly-wheel) back of the other piston, 4. When the parts are in the position shown in these figures, the tension of the gases in the connected cylinders 2 and 3 is about that of the atmosphere, and the further outward motion of the piston 5 in the secondary cylinder, creating a partial vacuum in both cylinders, will draw a charge of mingled air and gas through the air and gas inlet valves at the upper end of the cylinder 2, which for this purpose are opened at that time by suitable mechanism. This indraft of the explosive charge is cut off by closing of the gas and air inlet valves, and the moment after this the piston 4, having risen above the level of the ports 14, cuts off communication between the two cylinders; but as the lower edge of the piston moves past the lower edge of the ports 14 it opens communication between these ports and the air, and therefore during the last part of the outstroke of the piston 5 (say about one-eighth of the stroke) it draws cold air into the pipe 15. When the piston 5 begins its instroke, the valve 18 has connected the ports 14 with the exhaust-ports 17, so that during the instroke the gases in the cylinder 3 and channel 15 are expelled by the piston 5 and escape through the exhaust 16. Meanwhile the piston 4 has risen in the primary cylinder 2, and until the end of its instroke compresses the explosive gaseous charge which was drawn in during the outstroke of the secondary piston 5, and when the piston 4 has thus reached the limit of its instroke (the piston 5 being then at the middle of its instroke) the charge in the cylinder 2 is ignited by means of an igniting device at the upper end thereof, and by its impulse propels the piston 4 downward, exerting its energy on this piston alone until the piston, having passed the upper end of the ports 14, opens communication between the cylinders 2 and 3, and allows the expanding gas to rush through the channel 15 and to exert its energy also on the piston 5, which the moment before had begun its outstroke and had drawn in a small supply of air, thus giving a second impulse to the crank-shaft 8, which it continues to impel until the gas has expended its expansive force and has been reduced to atmospheric pressure, when the parts will be again at about the position shown in Figs. 1 and 2. Then for the remainder of the outstroke of the secondary piston it draws a fresh explosive charge into the primary cylinder and a supply of fresh air into the channel 15, and during its instroke expels the burned gas through the exhaust-port, while the piston 4 on its instroke is compressing the charge, as before described. Thus the operations of the engine are continued indefinitely in the same order—viz., the creation of a suction in the secondary cylinder which draws in the explosive charge, the compression of the charge and indraft of air into the channel 15, the exhaust of the previously-burned charge, the explosion and impulse on the piston 4, the second short indraft of cold air into the channel 15, the secondary action of the expanded gas on the piston 5, and so on. I have already noted that at the end of its outstroke the secondary piston 5 draws a small supply of fresh air into the pipe 15, and so at the beginning of its outstroke, the ports 14 being then also momentarily open to the outer air, a like supply is drawn in, so that the burned gases in the secondary cylinder are interposed between two layers of cold air. This is a point of material advantage, because it cools the cylinder and prevents the evil effects of heating on the parts of the engine, and especially because it condenses the lubricating-oil, which otherwise would be volatilized and carried off with the exhaust, thus not only saving the oil, but preventing to a large degree that disagreeable smell which has been so characteristic of gas-engines.

It will be noticed that I have illustrated the connection of the secondary cylinder with the outer air during these short indrafts as being with the open end of the primary cylinder below the piston of the latter. The consequence of this construction is that any gas leaking from the primary cylinder is drawn by suction into the secondary cylinder and is forced out therefrom by the exhaust; and in this way I prevent, to a large degree, the emission of offensive gases from the engine.

An important feature of my invention which I may here notice is the fact that the burned gas is not exhausted from the engine until, by reason of its expansion in the secondary cylinder 3, it has been reduced to atmospheric pressure, and the engine is thus rendered as nearly noiseless in its action as possible.

I will now describe the construction and operation of the gas and air inlet ports and valves, referring especially to the figures on the fourth sheet of the drawings.

In the head of the primary cylinder 2 is an air-inlet channel, 19, communicating with the open air, and connected with the interior of the cylinder by a port which is closed by a lift disk-valve, 20, the stem 21 of which is hollow and extends up through the cylinder-head, above which it is connected with the forked end of a lever, 22, whereby it is given its necessary vertical motion. This hollow stem 21 constitutes the inlet-channel for the gas, and is connected with the gas-supply pipe 23 by orifices made in the stem at a place where the stem passes through the chamber into which the gas-pipe opens. The gas-channel constituted by this hollow valve-stem is controlled by a valve, 24, bearing against the lower end of the hollow stem, and having a stem, 25, which extends up through and above the top of the hollow stem, where it is upheld by means of an encircling spring, 26. At its lower end the valve-stem 21 and valve 20 are so formed as to afford a projecting annulus, beneath which a second annulus or disk, 27, is fixed to it, but is separated therefrom, so as to leave a small space between them. This annular opening thus formed is the gas-jet, and is of material benefit in insuring the intimate commixture of the air and gas. The lever 22, by which the valve-stem 21 is moved, is pivoted on an axis, 28, and has a second arm, 29, which is pivotally connected at the end with a vertical connecting-rod, 30, which at its lower end is connected with a lever, 31, pivoted at a point, 32, and having at its free end a friction-roller, 33, which rests on the periphery of a cam-disk, 34, on the fly-wheel shaft. At a certain predetermined point in the revolution of the fly-wheel shaft the cut-away portion of the cam 34 comes opposite to the friction-roller 33, and by thus removing the support of the lever 31 suffers a spring, 35, drawing on the lever 22, to move this lever so as to depress the hollow valve-stem 21 and to unseat the air-valve 20, so as to permit suction of air into the cylinder 2. In order to operate the gas-valve, I provide a lever, 36, which is loosely fulcrumed to a post, 37, and is connected with the hollow stem 21 by a rod, 38. The free end of this lever is directly above the upper projecting end of the gas-valve stem 25, so that when the air-valve stem 21 moves downward it will, after a portion of its motion, draw down the lever 36 on the gas-valve stem, so as to unseat this valve. The entering gas then is drawn in an annular jet into the cylinder, and by reason of this form of the jet it is very intimately commingled with the air, which enters in a circular sheet around the gas-jet. The same effect is produced by making the gas-jet consist of a series of radial jet-holes instead of a single opening produced by separation of the disks.

The gas-inlet valve may be caused to be open during any fractional part of the period of opening of the air-valve, and the proper relative proportion of gas and air secured in the charge by an adjustment of the post 37, which is movably mounted on a rib, 39, and can be adjustably fixed thereon nearer to or more remote from the valve-stems by a set-screw, 40.

In order to regulate the gas and air valves so as to secure uniformity in speed of the engine, (see Figs. 2, 3, and 4,) I provide on the fly-wheel shaft, beside the disk-cam 34, a loosely-mounted disk, 41, which is movable thereon to and from the cam, and is connected by arms 42 with the ends of two bell-crank levers, 43, which are fulcrumed to posts 44, projecting from the fly-wheel, and have at their free ends weighted balls 45. When the speed of the fly-wheel exceeds a certain limit, the balls 45 are thrown out by centrifugal force, and through the levers 43 move the disk 41 up to the cam 34 and under the friction-roller 33. This in a manner covers the eccentricity of the cam and keeps the roller 33 from entering the cut-away portion of the cam, thus preventing operation of the gas and air valves, so that until the disk 41 is withdrawn by slackening the speed of the engine the supply of gas and air to the cylinder is stopped. The disk is thus withdrawn by the retractive action of the spring 46 or otherwise. When the gas and air inlet is cut off, as just described, it is obvious that the out-stroke of the secondary piston 5 would produce a partial vacuum in the cylinders, which, not being satisfied by the usual admission of gas and air, would act to waste effective energy by retarding the motion of the engine. To prevent this, I provide the cylinder 3 with an inwardly-opening suction-valve, 47, which controls an air-port, 48, so that when the partial vacuum before mentioned is caused by the piston 5 the valve 47 shall open and shall admit a supply of air to the cylinder. This suction-valve also opens momentarily to let in a small quantity of air in each outstroke of the piston 4 just as this piston is crossing the ports 14. It is desirable, however, that the valve should then be closed otherwise than by the pressure of compressed exploding air or gas admitted to the cylinder 3 on opening the ports 14, because that would necessarily allow the escape of a small portion of the exhaust-gas under pressure and make an unpleasant noise, which it is the object of my invention in as far as possible to overcome. I therefore extend the stem 49 of the valve 47 outward into a small cylinder, 50, wherein it has fixed to it a piston, 51. This cylinder is connected with the cylinder 2 by a by-pass pipe, 52, which enters the small cylinder 50 above the piston 51 and enters the cylinder 2 just above the ports 14, so that in the downstroke of the piston 4, before it uncovers the ports 14 and admits the expanding gases into the secondary cylinder 3, it uncovers the port of the pipe 52, and allows a small quantity of the compressed gas to enter the cylinder 50 and to act on the small piston 51, thereby closing the valve 47 with rapidity and certainty before uncovering of the ports 14. This feature of operating a suction-valve by means of a small cylinder and piston operated by connection with the power-cylinder of the engine, so that the valve is either closed solely or partially by the pressure in the special cylinder or opened solely or partially by the suction produced by rarefaction of gas in the cylinder acting on the special piston, is one which is capable of use in many different combinations in a gas-engine—e. g., in connection with the air and gas inlet valves, &c.—and I therefore desire to cover it broadly by this application.

The igniting device which I employ is shown in Figs. 2, 4, 5, 6, and 10. It consists of a dynamo, 53, driven by a belt, 54, from a pulley, 55, on the fly-wheel shaft, and rotary sparking-disk 56 and terminal 57 in the cylinder 2, which are electrically connected with the dynamo by conductors 58 and 59. The disk 56 is rotated at the proper moment to produce a spark by means of a ratchet, 60, and pawl 61, which are operated by a cam, 64, acting on the pawl through levers 62 and connecting-rod 63. This igniting device is a common one and forms no part of my invention. It may be substituted by any other suitable ignitor operating electrically or by combustion, as may be desired.

I shall now describe the operation of the starting-chamber.

In the operation of gas-engines of this general class it is usual to start them in action by turning the fly-wheel a few revolutions by the hand. In large engines this is a work of very considerable difficulty, owing to the resistance offered by the cylinder in the act of compression. To obviate this and to make it easy for one man to start the engine, I connect the explosion-cylinder 2 with a chamber, 65, provided with a suitable hand-valve, 66, whereby it may be cut off from or caused to communicate with the cylinder, as desired. In starting the engine I first open the valve 66, and by thus throwing the chamber 65 into communication with the cylinder it of course increases the capacity of the explosion-chamber, so that the gases on the instroke of the piston will not be nearly so much compressed, and will therefore not offer so much resistance. This makes the engine very easy to start, and as it gradually acquires momentum I close the valve 66 and restore the explosion-chamber to its normal capacity. If desired, there may be several of these chambers provided, each having a valve, and by opening them and then closing them in succession the engine may be started very gradually.

The remaining features of the engine which have to be noted are the counterbalancing of the crank 9 by means of the counter-weight 67, set on the crank-shaft diametrically opposite to the crank, and a special construction of the fly-wheel itself. There is always a tendency in fly-wheels of gas-engines, by reason of their elasticity, to yield somewhat to the recoil of the explosion, and thus, by producing unsteadiness of motion, to impair the efficiency of the engine, making it noisy and causing it to jar. I prevent this by making the spokes 68 of the fly-wheel of approximately triangular form, the base of the triangle being at the hub and the apex at the rim. This strengthens the fly-wheel near the central part, and by increasing its rigidity prevents the evils above noted.

The advantages of my invention will be apparent to the skilled mechanic from the foregoing description.

The engine is very efficient and utilizes all the available power by reason of the fact that there are two impulses for each revolution and that all the expansion of the gas is employed. So by the use of the rollers on the piston the friction from the side-thrust is avoided. The engine is noiseless and odorless. It is also very simple in its construction by reason of the use of the secondary cylinder to draw in the charge of air and gas, thus avoiding the necessity of using special valves and forcing apparatus. The air and gas mixing devices and the other parts of my improvement are advantageous for the reasons which I have already pointed out.

My invention may be very greatly modified in form, and some of the parts may be rearranged or altered so as to possess some of their present functions and to omit others without departing from the principles of my invention. For example, the suction feature of the secondary cylinder may be used without its impelling feature, the two cylinders may be set parallel to each other and connected with different crank-shafts, and other like changes will readily suggest themselves to those skilled in the art. All such I intend to cover by the following claims.

I claim—

1. A gas-engine having a primary cylinder and a secondary cylinder, said cylinders having pistons and being connected, and the piston of the primary cylinder being driven in advance of the piston of the secondary cylinder, whereby the propelling energy of the charge acts first on the primary cylinder and then through the connecting-channel on the secondary cylinder, the said secondary cylinder being made of such capacity that the outstroke of the secondary piston shall reduce the tension of the exploded gases below that of the charge of the explosive gas and air which is supplied to the primary cylinder, thereby creating a suction by which the explosive charge shall be drawn into the primary cylinder, substantially as and for the purposes described.

2. In a gas-engine, a lift disk-valve controlling an air-inlet port, a gas-channel passing through the disk of the lift-valve, and a second disk-valve seated on the disk of the air-valve and controlling the gas-inlet, substantially as and for the purposes described.

3. In a gas-engine, an air-inlet valve worked mechanically by action of the driven parts of the engine, and a gas-inlet valve, and an adjustable lever which is connected to the air-valve and arranged to move the gas-valve when the air-valve is moved, substantially as and for the purposes described.

4. A gas-engine having a primary cylinder and a secondary cylinder, said cylinders having pistons and being connected, whereby the propelling energy of the charge acts first on the primary cylinder and then through the connecting-channel on the secondary cylinder, the said secondary cylinder being made of such capacity that on the outstroke of the piston of the secondary cylinder the exploding gases, which first act expansively upon the said piston, shall afterward be reduced thereby to a tension below that of the charge of explosive gas and air which is supplied to the primary cylinder, thereby creating a suction by which the explosive charge shall be drawn into the primary cylinder, substantially as and for the purposes described.

5. In a gas-engine having a primary cylinder which is charged by suction of another cylinder, the combination of the primary cylinder and a secondary cylinder, said cylinders having pistons and being connected by a channel which is opened during the outstroke of the primary cylinder, the secondary cylinder being of such capacity that on the outstroke of the secondary piston the exploded gases, which first act expansively upon the said piston, shall afterward be reduced thereby to a tension below that of the explosive charge while the said cylinders are in communication, and an exhaust through which the gases are expelled by the return-stroke of the piston of the secondary cylinder, substantially as and for the purposes described.

6. In a gas-engine, the combination, with a primary explosion-cylinder which is charged by suction of another cylinder, and a primary driving-piston, of a secondary cylinder and its piston, said cylinders communicating, and the piston of the primary cylinder in its passage opening and closing said communication, the piston of said primary cylinder being set to move in advance of the other piston, substantially as and for the purposes described.

7. In a gas-engine having a primary explosion-cylinder which is charged by the suction of another cylinder, the combination, with the primary cylinder and its piston, of a secondary cylinder and its piston, a port or channel which affords communication between the cylinders and which is controlled by the primary piston, an exhaust-port, and a sliding valve on the piston which connects these ports, substantially as and for the purposes described.

8. The combination, in a gas-engine, of a primary cylinder and a secondary cylinder communicating therewith, so that the exploding gas shall exert its energy on the cylinders in succession, and an opening to the external air which is opened before the beginning of the entrance of the gases to the secondary cylinder, and also at the end of the action of the gas therein, whereby the burned gas in the secondary cylinder is interposed between layers of cold air, substantially as and for the purposes described.

9. The combination, in a gas-engine, of a primary cylinder and a secondary cylinder communicating therewith, so that the exploding gas shall exert a propelling force on the cylinders in succession, said cylinders having an air-inlet which is opened positively at each outstroke of the piston of the secondary cylinder to admit air to be mingled with the burned gas, substantially as and for the purposes described.

10. In a gas-engine, the combination of the primary and secondary cylinders which are connected by a passage, an inlet into the primary cylinder for the explosive charge, and a piston in the primary cylinder which on its outstroke opens communication between the cylinders and maintains the same until the gases in the cylinders, having first acted with propulsive force on the secondary piston, shall have been reduced in tension below that of the explosive charge, and which on its back-stroke cuts off said communication after the admission of the charge, as aforesaid, and during the remainder of its back-stroke compresses the charge, said secondary cylinder being in free communication with the atmosphere immediately before the communication between the cylinders is established, substantially as and for the purposes described.

11. A gas-engine having a valve operated by suction and a special cylinder communicating with the engine-cylinder, and having a piston connected with the stem of the valve, whereby the valve is shut through the pressure in the engine-cylinder, substantially as and for the purposes described.

12. A gas-engine having a primary cylinder and a secondary cylinder connected therewith and acting to create a suction in the primary cylinder for the indraft of the charge, and a suction-valve in the secondary cylinder which is opened when the pressure in the secondary cylinder falls below a certain limit, substantially as and for the purposes described.

13. A gas-engine having a speed-governor, a primary cylinder provided with a valve for the admission of the explosive charge, which valve is controlled by action of the speed-governor, and a secondary cylinder which charges the primary cylinder with explosive mixture by suction when the said valve is opened, and an automatic inlet-valve in the secondary cylinder which opens by suction to admit air when the inlet-valve of the explosive charge is not opened, substantially as and for the purposes described.

14. A gas-engine having a primary high-pressure cylinder provided with an inlet for the explosive charge and a secondary low-pressure cylinder communicating therewith, said cylinders being provided with pistons, the piston of the latter expanding the partially-spent gases from the primary cylinder during the first part of its stroke and charging the primary cylinder by suction during the termination of its stroke, substantially as and for the purposes described.

15. In a gas-engine, the combination of a primary explosion-cylinder, a secondary cylinder connected therewith by a port, an exhaust-port, and a slide-valve on the piston of the primary cylinder, which in its passage connects the said ports, said slide-valve being separated from the piston by an intervening space which affords access of air to the first-named port before its connection with the exhaust-port by the slide-valve, substantially as and for the purposes described.

16. A gas-engine having a primary cylinder and a secondary cylinder which communicate with each other and are provided with pistons, the primary cylinder being in communication with the secondary cylinder during the outstroke of the piston of the latter and arranged so that the exploding gas shall exert a propelling force on the cylinders in succession, and that the gases shall then be so expanded in the secondary cylinder as to create a suction in the primary cylinder, an inlet for the explosive charge, a valve controlling the same, and mechanism which holds the said valve open at the time when the piston has moved sufficiently to create a suction in the primary cylinder, substantially as and for the purposes described.

Witness my hand, at New York city, this 1st day of December, 1887.

CARL THEODOR AUGUST HERMANN WIEDLING.

Witnesses:
    THOMAS W. BAKEWELL,
    M. M. FREEMAN.